(12) United States Patent
Eliasson et al.

(10) Patent No.: US 6,284,157 B1
(45) Date of Patent: Sep. 4, 2001

(54) PROCESS FOR PRODUCING AN $H_2$-CO GAS MIXTURE

(75) Inventors: Baldur Eliasson, Birmenstorf; Ulrich Kogelschatz, Hausen, both of (CH); Li-Ming Zhou, Toronto (CA)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/220,604

(22) Filed: Dec. 28, 1998

(30) Foreign Application Priority Data

Dec. 27, 1997 (DE) ................................. 197 57 936

(51) Int. Cl.[7] ................. C07C 1/02; C01B 3/24; C01B 3/26; B01J 19/08; B01J 19/12
(52) U.S. Cl. ..................... 252/373; 423/650; 423/652
(58) Field of Search ............... 252/373; 423/650, 423/652; 422/186.04

(56) References Cited

U.S. PATENT DOCUMENTS

| | | | |
|---|---|---|---|
| 4,105,755 | * | 8/1978 | Darnell et al. ............... 423/648 |
| 4,973,453 | * | 11/1990 | Agee ........................... 422/190 |
| 5,578,647 | * | 11/1996 | Li et al. ....................... 518/700 |
| 5,855,815 | * | 1/1999 | Park et al. .................... 252/373 |
| 6,007,742 | * | 8/1998 | Czernichowski et al. ...... 252/372 |
| 6,027,617 | * | 2/2000 | Hayashi et al. ............... 204/170 |
| 6,136,278 | * | 10/2000 | Eliasson et al. ............. 422/186.04 |

FOREIGN PATENT DOCUMENTS

| | | |
|---|---|---|
| 1248624 | 8/1967 | (DE) . |
| 0215930B1 | 6/1990 | (EP) . |
| WO92/02448 | 2/1992 | (WO) . |
| WO97/29833 | 8/1997 | (WO) . |

OTHER PUBLICATIONS

"Kohle, Gaserzeugung", Ullmanns Encyclopedie der Technischen Chemie, 1977, p. 398–399.

* cited by examiner

Primary Examiner—Steven P. Griffin
Assistant Examiner—Jonas N. Strickland
(74) Attorney, Agent, or Firm—Blank Rome Comisky & McCauley LLP

(57) ABSTRACT

In a discharge reactor with a low-current gas discharge, an inlet gas made of a $CH_4$—$CO_2$ gas mixture is converted into a synthesis gas having an $H_2$—CO gas mixture which has a higher energy content than the inlet gas. For a predeterminable synthesis gas volume ratio $R=H_2/CO$, the requisite $CO_2$ proportion in the inlet gas can be derived from a function curve (f) or calculated according to $$V=-4.76 \cdot R^3 + 37.57 \cdot R^2 - 99.13 \cdot R + 105.39.$$

8 Claims, 1 Drawing Sheet

PROCESS FOR PRODUCING AN $H_2$-CO GAS MIXTURE

BACKGROUND OF THE INVENTION

1. Field of the Invention

The invention is based on a process of producing an $H_2$—CO gas mixture from an inlet gas which contains $CH_4$—$CO_2$ gas mixture.

2. Discussion of Background

The present invention relates generally to the use of a discharge reactor, art as disclosed by WO 97/29833. In the latter, in order to efficiently obtain fuels and/or propellants from an undesired greenhouse gas, preferably from nitrogen or laughing gas, and a hydrogen-containing gas or vapor, these gases are subjected in a first reactor to a silent electrical discharge. This produces excited or ionized atoms and/or molecules which are converted in a catalytic reactor with a copper-containing first catalyst into $H_2$ and, where appropriate, CO. Through a relief valve, a liquid of a fuel and/or propellant precipitates in a liquid container. Gases escaping from the liquid container are fed through a thermal reactor with a second catalyst and relieved through a relief valve. In a downstream liquid container, $CH_3OH$, for example, precipitates as the desired liquid propellant. Teaching as to what proportion of $CO_2$ in the inlet gas is required for the reactor in order to obtain a predeterminable synthesis gas volume ratio $R=H_2/CO$ at the output is not disclosed by this publication.

SUMMARY OF THE INVENTION

Accordingly, one object of the invention, is to provide a novel process for producing an $H_2$—CO gas mixture of the type mentioned at the start, such that for predeterminable values of a synthesis gas volume ratio $R=H_2/CO$, the proportion of $CO_2$ in the inlet gas needed for this can be specified.

One advantage of the invention consists in that synthesis gas can be obtained more effectively with desired compositions. When the inlet gases have the desired composition, less carbon is formed, which can precipitate as an undesirable conductive deposit in the reaction space of the discharge reactor or can destroy a catalyst possibly arranged therein. This advantage is particularly significant for a $CO_2$ proportion of >50% in the gas mixture. It has also been found advantageous to add water vapor to the inlet gas since this also contributes to reducing the formation of carbon.

A further advantage resides in the fact that the reaction temperature may be $\leq 100°$ C. The synthesis is substantially independent of the pressure of the inlet gases, their temperature and throughput.

By virtue of the production process, which can also be operated without a catalyst, electrical energy can be converted into chemical energy, stored and readily transported. The greenhouse gases used as input are available at low cost. The undesired $CO_2$ content in the air can be reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
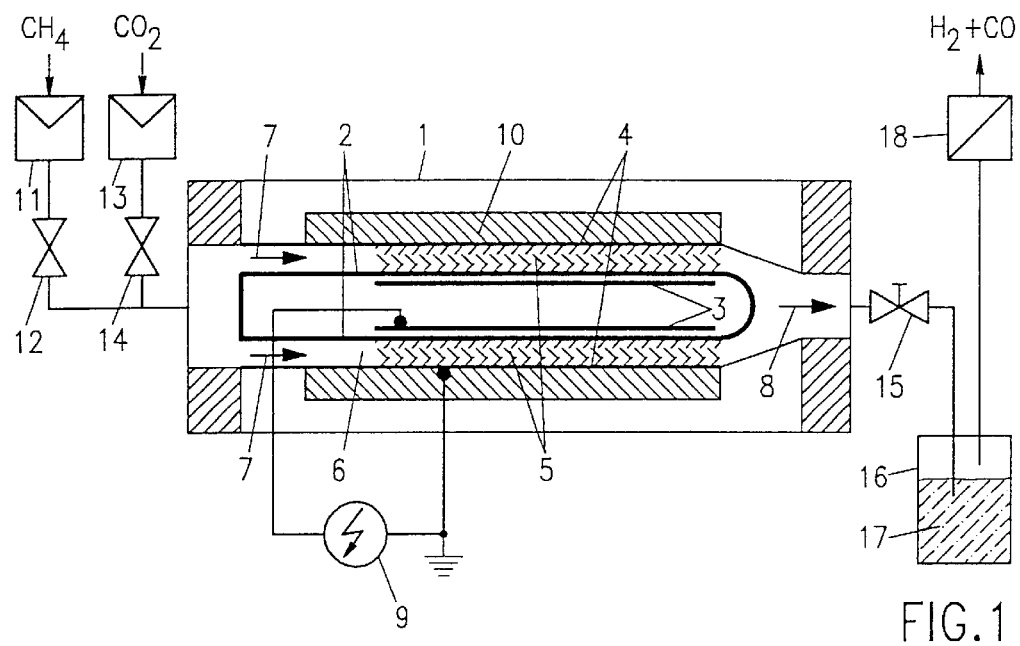
FIG. 1 shows a discharge reactor with gas inlets and outlets.

Referring now to the drawings, wherein like reference numerals designate identical or corresponding parts throughout the several views, in a reaction space (6) of a catalytic reactor or discharge reactor or reactor (1) with a quartz dielectric tube (2), an inner electrode (3) which is arranged therein and is made of a corrosion-resistant metal or of a metal alloy or of an electrically conductive layer, a grounded metal container or steel tube (4) which at the same time serves as the outer electrode, and a catalyst (5) arranged in the reaction space (6) between the dielectric tube (2) and the steel tube (4), inlet gases (7) are fed in from the left. The greenhouse gases methane, $CH_4$, and carbon dioxide, $CO_2$, are used as the inlet gases (7) and are converted in the reactor (1) into reaction gases or outlet gases or synthesis gases (8) made up of an $H_2$—CO gas mixture, and are delivered in the direction of the arrow to the right. The inlet gases (7) may additionally contain water vapor. The steel tube (4) has an internal diameter of 54 mm, and the quartz tube (2) has an external diameter of 52 mm, for a wall thickness of 2.5 mm. The distance between the outer cylindrical surface of the quartz tube (2) and the inner cylindrical surface of the steel tube of the reactor (1) should be in the range from 0.5 mm to 3 mm, and should preferably be 1 mm. The length of the reaction space (6) is 310 mm, and its volume about 50 ml.

The inner electrode (3) is electrically connected at the end to an AC voltage source (9) with an AC voltage in the range of 5 kV–50 kV, preferably 20 kV, and a frequency in the range of 50 Hz–1 MHz, preferably 30 kHz. The power of the AC voltage source (9) is in the range of 100 W–1 kW.

The catalyst (5) has a chemically inert gas and vapor permeable support material or catalyst support made of glass mat or glass fiber mat, on which catalyst material or catalyst powder or catalyst grains with a diameter of less than 1 mm are uniformly distributed (not shown). The discharge reactor (1) may also be operated without a catalyst (5).

On the outside, at least around one region of the steel tube (4), a thermostat or a heating element or a heating device (10) is provided, with which the reaction space (6) can be kept at a predeterminable reaction temperature, $\leq 100°$ C.

The greenhouse gases $CH_4$ and $CO_2$, which can contribute through the undesired greenhouse effect to the heating of the Earth's atmosphere, are fed from high pressure bottles (not shown) via gas flow regulators (11) and (13), respectively, and valves (12) and (14), respectively, as inlet gases (7) to the discharge reactor (1). $CO_2$ is primarily obtained from the waste gas of power stations, and $CH_4$ from natural gas fields. The throughput of the gas flow regulators (11) and (13) is in the range of 0.1 l/min–4 l/m, referring to standard temperature and pressure conditions.

At its output, the reactor (1) is connected through a relief valve (15) for a pressure of $10^6$ Pa in the reactor space (6) to a condensate precipitator or liquid container (16) which may be cooled with liquid nitrogen. The reaction temperature in the reaction space (6) can be kept constant at a predeterminable temperature, for example up to 350° C., by means of the heating device (10).

Through the expansion of the gases after the relief valve (15), a reaction liquid (17) made up of reaction products, for example methanol and other hydrocarbon compounds, precipitates in the liquid container (16), and these can be used as fuels. The $H_2$—CO gas mixture delivered from the liquid container (16) is fed to a gas flow meter (18) with which the amount of synthesis gas (8) produced can be measured.

Other gases and/or vapors, for example, $H_2O$, $SO_2$, CO, $No_x$, $H_2S$ and $O_2$ may be mixed with the inlet gas (7) as impurity in a volume proportion of up to 10%. With the aforementioned discharge reactor (1), it is possible to achieve $H_2$ concentrations of up to 46% and CO concentrations of up to 14% with a $CH_4$:$CO_2$ ratio=8:2, 64% of the $CH_4$ and 54% of the $CO_2$ having been converted. The C selectivity for CO is 30%, that is to say 30% of carbon C from the inlet gas (7) enters the reaction product in the synthesis gas (8). The H selectivity of $H_2$ is 50%. For synthesis gas volume ratios R=$H_2$/CO of up to 4:1, the associated $CH_4$/$CO_2$ quantity ratios can be specified. Synthesis gas volume ratios $R \leq 1$ are of particular economic importance for catalytic processes and, for example, acetic acid production.

The chemical conversion of the inlet gases (7) in the discharge reactor (1) takes place with input of energy according to the following equation: $CO_2 + CH_4 \rightarrow 2 \cdot CO + 2 \cdot H_2$.

The enthalpy difference $\Delta H$ per mole is in this case 223.5 kJ. This process can therefore be used for storing energy and transforming energy, electrical energy being converted into chemical energy.

Figure 2:
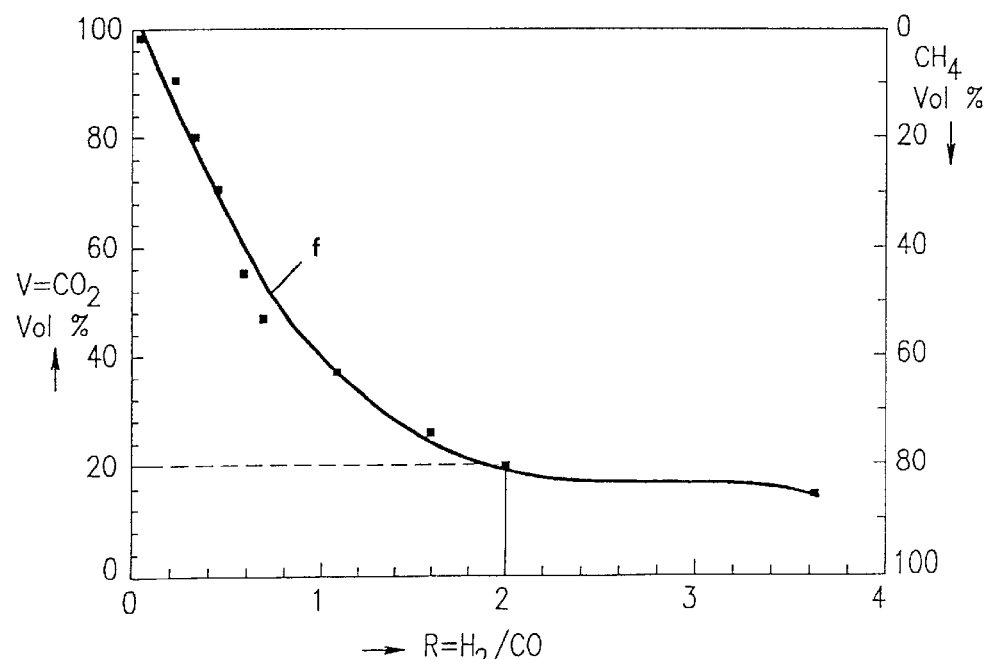
FIG. 2 shows a function curve which represents the synthesis gas volume ratio $R=H_2/CO$ as a function of the proportion of $CO_2$ in the inlet gas.

In a function curve (f), FIG. 2 shows the relationship of the $CO_2$ proportion in the inlet gas (7) in vol.-% according to: V=($CO_2$/($CO_2$+$CH_4$))·100, which is plotted on the ordinate, and the synthesis gas volume ratio R=$H_2$/CO, which is plotted on the abscissa. On the right-hand side, the proportion of $CH_4$ in the inlet gas (7) is plotted in vol.-%. The proportion of $CH_4$ in the inlet gas (7) is obtained by subtracting the $CO_2$ proportion from 100. If, for example, a value of 2 is desired for the synthesis gas volume ratio R, as is needed for methanol production, then a $CO_2$ proportion in the inlet gas (7) of about 20 vol.-% is derived from the function curve (f). For methane production, R=3 is needed, etc. Depending on the desired R value, the required $CO_2$ proportion in the inlet gas (7) can be read from the function curve (f). What is important is that the $CH_4$—$CO_2$ gas mixture in the inlet gas (7) for a predetermined synthesis gas volume ratio R does not deviate by more than ±20%, preferably by no more than ±5% from the associated value or $CO_2$ proportion from the function curve (f).

From the function curve f(V, R), for a predeterminable value of R, the desired proportion V of $CO_2$ in the inlet gas (7) is also obtained analytically according to the following equation:

$$V = -4.76 \cdot R^3 + 37.57 \cdot R^2 - 99.13 \cdot R + 105.39.$$

The reaction in the discharge reactor (1) can be carried out at room temperature, which saves energy.

The addition of water vapor to the inlet gas (7) has a positive effect on the conversion process.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A process for producing a synthesis gas which contains an $H_2$—CO gas mixture, the process comprising:

a) providing an inlet gas which contains a $CH_4$—$CO_2$ gas mixture;

b) providing a discharge reactor including a dielectric, an electrode facing a first surface of the dielectric, and a metallic tube facing a second surface of the dielectric, a reaction space being defined between the dielectric and the metallic tube;

c) passing the $CH_4$—$CO_2$ gas mixture through the reaction space of the discharge reactor in which a low-current gas discharge is operated from an AC electrical voltage source via the dielectric; and d) obtaining a predeterminable synthesis gas volume ratio R=$H_2$/CO smaller than one in the synthesis gas by varying the proportional volume of $CO_2$ in the inlet gas according to a predetermined function, wherein said proportional volume does not deviate by more than ±20% from an associated function value which can be derived from the predetermined function.

2. The process as claimed in claim 1, wherein the proportional volume of $CO_2$ is defined by V=($CO_2$/($CO_2$+$CH_4$))·100.

3. The process as claimed in claim 1, wherein the proportional volume of $CO_2$ in the inlet gas does not deviate by more than ±5% from the function value derivable from a function curve of the predetermined function.

4. The process as claimed in claim 1, wherein the predetermined function is defined by the following equation:

$$V = -4.76 \cdot R^3 + 37.57 \cdot R^2 - 99.13 \cdot R + 105.39.$$

5. The process as claimed in claim 1, wherein a reaction temperature $\leq 100°$ C. is maintained in the discharge reactor.

6. The process as claimed in claim 1, wherein the proportion of the $CH_4$—$CO_2$ gas mixture in the inlet gas is at least 90%.

7. The process as claimed in claim 1, wherein the inlet gas contains water vapor.

8. The process as claimed in claim 1, wherein the reaction space includes a catalyst.

* * * * *